United States Patent
Nagano et al.

(10) Patent No.: US 12,197,198 B2
(45) Date of Patent: Jan. 14, 2025

(54) ABNORMALITY DIAGNOSIS SYSTEM AND ABNORMALITY DIAGNOSIS METHOD

(71) Applicant: JFE STEEL CORPORATION, Tokyo (JP)

(72) Inventors: Tetsushi Nagano, Tokyo (JP); Takehide Hirata, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 414 days.

(21) Appl. No.: 17/758,358

(22) PCT Filed: Dec. 21, 2020

(86) PCT No.: PCT/JP2020/047726
§ 371 (c)(1),
(2) Date: Jul. 5, 2022

(87) PCT Pub. No.: WO2021/145156
PCT Pub. Date: Jul. 22, 2021

(65) Prior Publication Data
US 2023/0024947 A1 Jan. 26, 2023

(30) Foreign Application Priority Data
Jan. 14, 2020 (JP) .................................. 2020-003769

(51) Int. Cl.
G05B 23/02 (2006.01)
(52) U.S. Cl.
CPC ...... G05B 23/0221 (2013.01); *G05B 2223/02* (2018.08)
(58) Field of Classification Search
CPC ............ G05B 23/0221; G05B 2223/02; G05B 23/024; G05B 23/02; G01M 99/00
See application file for complete search history.

(56) References Cited

U.S. PATENT DOCUMENTS

| 10,247,599 B2 | 4/2019 | Takahashi et al. |
| 2019/0271975 A1 | 9/2019 | Guo |
| 2021/0397175 A1* | 12/2021 | Tsutsumi ............. G05B 23/024 |

FOREIGN PATENT DOCUMENTS

| JP | H026031 A | 1/1990 |
| JP | 2002181038 A | 6/2002 |

(Continued)

OTHER PUBLICATIONS

Jun. 21, 2023, the Extended European Search Report issued by the European Patent Office in the corresponding European Patent Application No. 20913851.0.

(Continued)

*Primary Examiner* — Charles Cai
(74) *Attorney, Agent, or Firm* — KENJA IP LAW PC

(57) ABSTRACT

Provided are an abnormality diagnosis system and an abnormality diagnosis method that can prevent wrongly diagnosing equipment as having an abnormality when the equipment actually does not have an abnormality. An abnormality diagnosis system 20 comprises a sampler 21 and a calculator 24. The calculator 24 is configured to: perform first abnormality determination of whether there is an abnormality based on a result of first principal component analysis; in the case where a result of the first abnormality determination is that there is an abnormality, and perform second abnormality determination of whether there is an abnormality based on a result of second principal component analysis; and in the case where a result of the second abnormality determination is that there is an abnormality, diagnose the equipment as having an abnormality.

18 Claims, 6 Drawing Sheets

(56) References Cited

FOREIGN PATENT DOCUMENTS

| | | | |
|---|---|---|---|
| JP | 2008059270 A | | 3/2008 |
| JP | 2008224519 A | | 9/2008 |
| JP | 4762088 B2 | | 8/2011 |
| JP | 5991042 B2 | * | 9/2016 |
| JP | 2017032567 A | | 2/2017 |
| RU | 2699685 C1 | | 9/2019 |
| WO | 2008079695 A1 | | 7/2008 |
| WO | 2016039088 A1 | | 3/2016 |
| WO | 2017176401 A1 | | 10/2017 |

OTHER PUBLICATIONS

May 30, 2023, Office Action issued by the Federal Service for Intellectual Property, Patents and Trademarks of the Russian Federation in the corresponding Russian Patent Application No. 2022121881 with English language search report.

Feb. 9, 2021, International Search Report issued in the International Patent Application No. PCT/JP2020/047726.

* cited by examiner

ABNORMALITY DIAGNOSIS SYSTEM AND ABNORMALITY DIAGNOSIS METHOD

TECHNICAL FIELD

The present disclosure relates to an abnormality diagnosis system and an abnormality diagnosis method that perform abnormality diagnosis on equipment including an equipment drive member.

BACKGROUND

Conventionally, equipment including an equipment drive member such as a hydraulic device or an electric motor is subjected to abnormality diagnosis based on, for example, a signal of current or applied load obtained from the equipment drive member. In the case where the operation of the equipment drive member repeats a predetermined fixed pattern, the use of principal component analysis (hereafter also referred to as PCA) for abnormality diagnosis is proposed (for example, JP 5991042 B2 (PTL 1) and JP 2017-32567 A (PTL 2)).

For example, in sizing press equipment, dies for width press are located on both sides of a slab conveyed, and power is transmitted from motors to the dies via cranks to width-press the slab in a constant period. A current waveform or applied load waveform that appears repeatedly during this is collected for each material, and the current waveform or applied load waveform for one cycle of the cranks is analyzed by PCA for each material to extract an abnormal waveform. The use of PCA enables more accurate equipment abnormality diagnosis than simple upper and lower limit check.

CITATION LIST

Patent Literature

PTL 1: JP 5991042 B2
PTL 2: JP 2017-32567 A

SUMMARY

Technical Problem

However, even when the equipment is actually not damaged, a phenomenon in which the waveform of current, applied load, or the like obtained from the equipment drive member is extremely small may occur randomly for some reason. For example, in sizing press operation, a waveform in which the applied load hardly rises may occur sporadically due to, for example, insufficient material conveyance caused by a pinch roll slip. When such a phenomenon occurs, the equipment is determined as abnormal even though the equipment is actually not damaged.

It could therefore be helpful to provide an abnormality diagnosis system and an abnormality diagnosis method that can prevent wrongly diagnosing equipment as having an abnormality when the equipment actually does not have an abnormality.

Solution to Problem

We thus provide the following (1) to (10).

(1) An abnormality diagnosis system configured to perform abnormality diagnosis on equipment that performs operation repeating a fixed pattern, the abnormality diagnosis system comprising: a sampler configured to sample time series data indicating a state of the equipment, the time series data repeating a pattern corresponding to the fixed pattern; and a calculator configured to perform principal component analysis based on the time series data sampled by the sampler, and diagnose whether the equipment has an abnormality, wherein the calculator is configured to: perform first principal component analysis on one pattern in the time series data indicating the state, and perform first abnormality determination of whether there is an abnormality based on a result of the first principal component analysis; in the case where a result of the first abnormality determination is that there is an abnormality, perform second principal component analysis collectively on a plurality of patterns successive in time including the pattern subjected to the first principal component analysis in the time series data indicating the state, and perform second abnormality determination of whether there is an abnormality based on a result of the second principal component analysis; and in the case where a result of the second abnormality determination is that there is an abnormality, diagnose the equipment as having an abnormality.

(2) The abnormality diagnosis system according to (1), wherein the first abnormality determination is based on Q statistic calculated from the result of the first principal component analysis, and the second abnormality determination is based on Q statistic calculated from the result of the second principal component analysis.

(3) The abnormality diagnosis system according to (1) or (2), wherein $N2<N1\times M$ or $k2<k1\times M$, where N1 is the number of sampling points of time series data used in the first principal component analysis by the calculator, k1 is the number of dimensions after dimensionality reduction by the first principal component analysis, N2 is the number of sampling points of time series data used in the second principal component analysis, k2 is the number of dimensions after dimensionality reduction by the second principal component analysis, and M is the number of the plurality of patterns where $M\geq 2$.

(4) The abnormality diagnosis system according to any one of (1) to (3), wherein the equipment is sizing press equipment that width-reduces a slab by driving a die using a drive motor, and the time series data indicating the state of the equipment is a current waveform of the drive motor or an applied load waveform of the die.

(5) The abnormality diagnosis system according to (4), further comprising a data preprocessor configured to subject the time series data sampled by the sampler to preprocessing including a process of normalizing a waveform height and a process of classification according to a width reduction amount.

(6) An abnormality diagnosis method of performing abnormality diagnosis on equipment that performs operation repeating a fixed pattern, the abnormality diagnosis method comprising: sampling time series data indicating a state of the equipment, the time series data repeating a pattern corresponding to the fixed pattern; performing first principal component analysis on one pattern in the time series data indicating the state; performing first abnormality determination of whether there is an abnormality based on a result of the first principal component analysis; performing, in the case where a result of the first abnormality determination is that there is an abnormality, second principal component analysis collectively on a plurality of patterns successive in time including the pattern subjected to the first principal component analysis in the time series data indicating the state; performing second abnormality determination of whether there is an abnormality based on a result of the second principal component analysis; and diagnosing the equipment as having an abnormality, in the case where a result of the second abnormality determination is that there is an abnormality.

(7) The abnormality diagnosis method according to (6), wherein the first abnormality determination is based on Q statistic calculated from the result of the first principal component analysis, and the second abnormality determination is based on Q statistic calculated from the result of the second principal component analysis.

(8) The abnormality diagnosis method according to (6) or (7), wherein $N2<N1\times M$ or $k2<k1\times M$, where N1 is the number of sampling points of time series data used in the first principal component analysis, k1 is the number of dimensions after dimensionality reduction by the first principal component analysis, N2 is the number of sampling points of time series data used in the second principal component analysis, k2 is the number of dimensions after dimensionality reduction by the second principal component analysis, and M is the number of the plurality of patterns where $M \geq 2$.

(9) The abnormality diagnosis method according to any one of (6) to (8), wherein the equipment is sizing press equipment that width-reduces a slab by driving a die using a drive motor, and the time series data indicating the state of the equipment is a current waveform of the drive motor or an applied load waveform of the die.

(10) The abnormality diagnosis method according to (9), further comprising subjecting the sampled time series data to preprocessing including a process of normalizing a waveform height and a process of classification according to a width reduction amount.

Advantageous Effect

It is thus possible to provide an abnormality diagnosis system and an abnormality diagnosis method that can prevent wrongly diagnosing equipment as having an abnormality when the equipment actually does not have an abnormality.

DETAILED DESCRIPTION

One of the disclosed embodiments will be described below, with reference to the attached drawings.

This embodiment describes the case where the presently disclosed techniques are applied to abnormality diagnosis of sizing press equipment.

Figure 1:
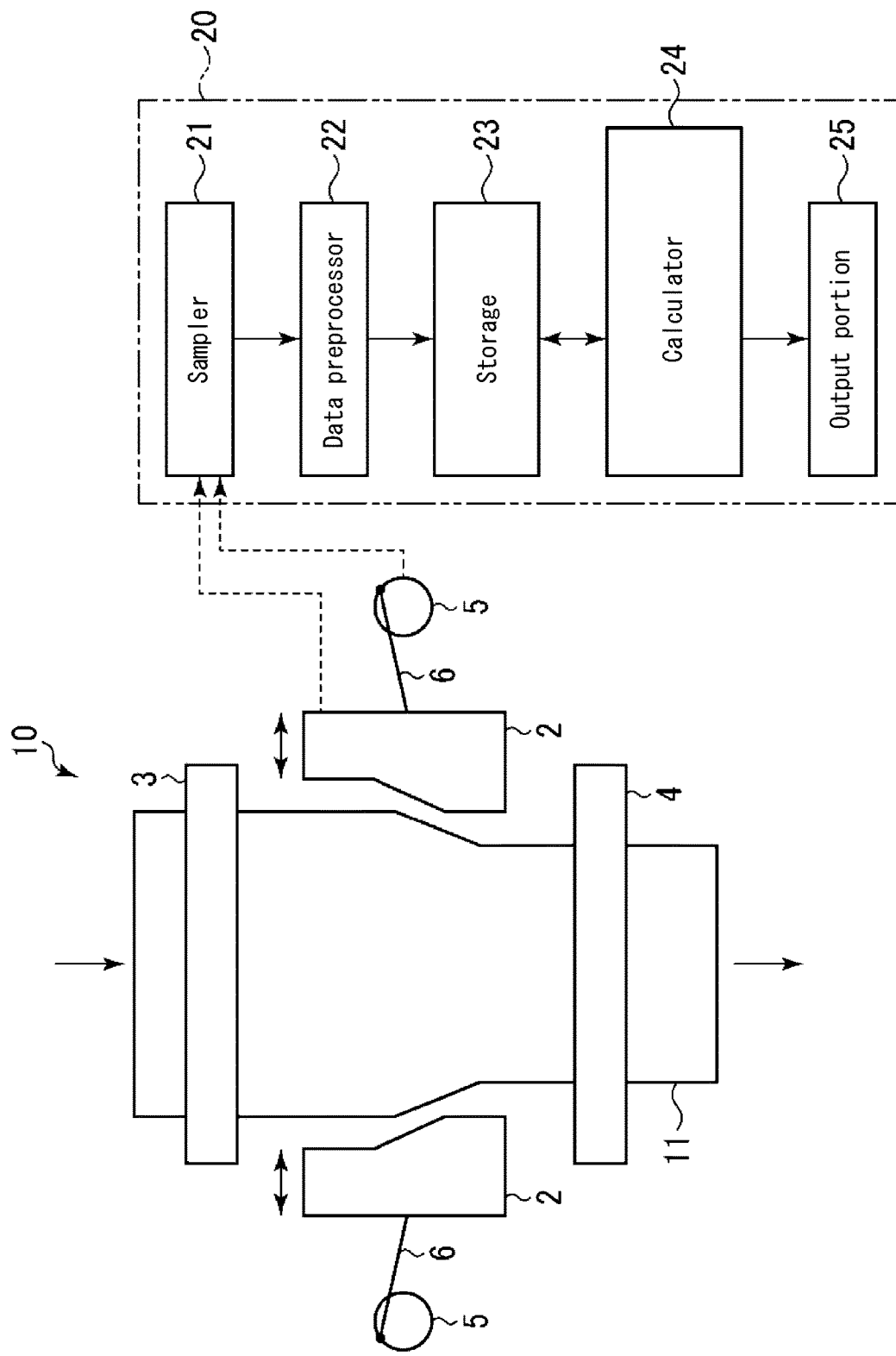
FIG. 1 is a schematic diagram and a block diagram illustrating an example of using, for sizing press equipment, an abnormality diagnosis system according to one of the disclosed embodiments.

FIG. 1 is a schematic diagram and a block diagram illustrating an example of using, for sizing press equipment, an abnormality diagnosis system according to the embodiment.

Sizing press equipment 10 width-reduces a slab 11 in a hot rolling line after continuous casting.

The sizing press equipment 10 includes a pair of dies 2, an entry pinch roll 3 and an exit pinch roll 4, a pair of drive motors 5 provided for the respective pair of dies 2 to drive the dies 2, and a pair of cranks 6 connecting the respective dies 2 and the respective drive motors 5.

In the sizing press equipment 10, the slab 11 is introduced between the pair of dies 2 facing each other by the entry pinch roll 3, width-reduced by the pair of dies 2 oscillated by power transmitted from the drive motors 5 via the cranks 6, and discharged by the exit pinch roll 4. The slab 11 is repeatedly width-reduced in a constant period by the dies 2 while being conveyed intermittently, to form a slab of a predetermined width.

An abnormality diagnosis system 20 diagnoses an equipment abnormality of the sizing press equipment 10, and includes a sampler 21, a data preprocessor 22, a storage 23, a calculator 24, and an output portion 25.

The sampler 21 samples time series data indicating the state of the equipment. In this embodiment, the time series data indicates load such as the current value of each drive motor 5 or the applied load of each die 2 when width-reducing the slab 11 by the dies 2. As time information for obtaining the time series data, crank angle information may be used. In this case, the time series data indicating the load such as current value or applied load is a waveform in which one waveform (pattern) with a peak corresponding to one cycle of the cranks 6 repeats itself. Specifically, the time series data is a current waveform or an applied load waveform.

The data preprocessor 22 preprocesses the data sampled by the sampler 21. The preprocessing includes a process of normalizing the height of the waveform corresponding to one cycle of the cranks 6 and a process of classifying the data according to the edging amount (width reduction amount) in the width reduction.

The storage 23 stores the preprocessed data. The storage 23 stores time series data (normal waveform) indicating load in normal time obtained beforehand, as a reference waveform.

The calculator 24 performs abnormality diagnosis on the waveform of the preprocessed time series data of the load (current value or applied load) stored in the storage 23, using principal component analysis (PCA). The diagnosis result is output to the output portion 25.

The analysis method using PCA is a method of extracting, from many chart waveforms, a chart waveform (abnormality) different in shape from a chart waveform in normal time.

PCA and a multivariate statistical process control method are used in the abnormal waveform extraction.

Figure 2:
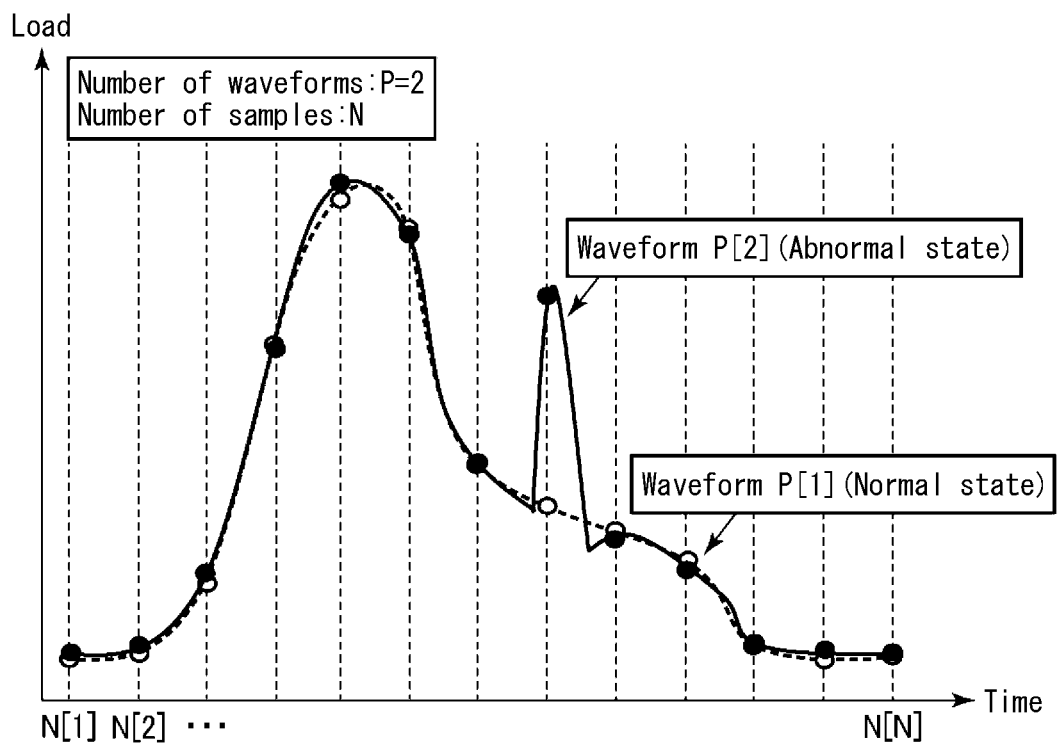
FIG. 2 is a diagram illustrating an example of sample waveforms when extracting an abnormal waveform.

FIG. 2 is a diagram illustrating an example of sample waveforms when extracting an abnormal waveform using PCA. In FIG. 2, the horizontal axis represents time, and the vertical axis represents load such as power value or applied load. In FIG. 2, there are two sample waveforms, namely, a waveform P[1] which is a reference waveform in a normal state and a waveform P[2] which is a waveform in an abnormal state (the number of waveforms: P=2). For these waveforms P[1] and P[2], N samples are collected at predetermined intervals in a waveform collection time period (the number of samples: N). For example, in the case of collecting samples at 100 ms intervals in a collection time of 5 sec, the number N of samples is 50.

Figure 3:
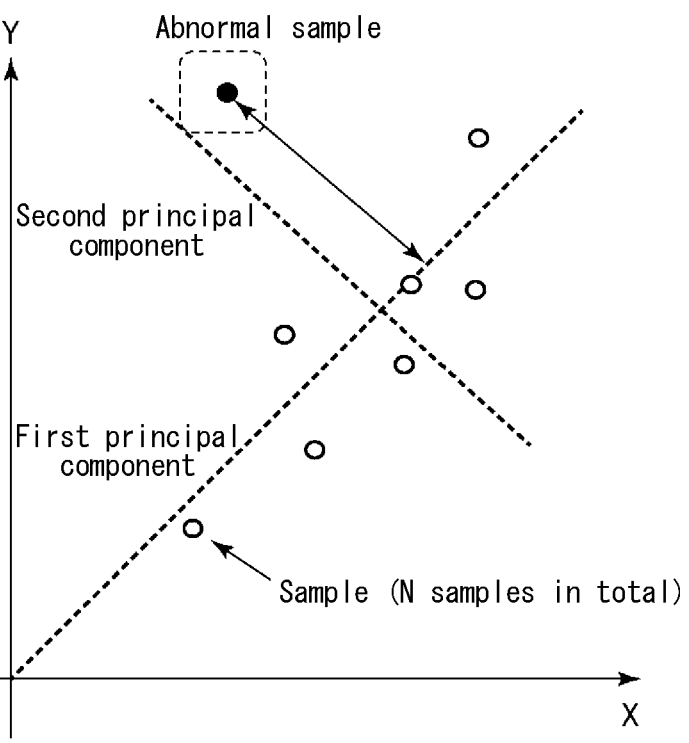
FIG. 3 is a diagram for explaining PCA performed using the sample waveforms in FIG. 2.

FIG. 3 is a conceptual diagram in the case of analyzing these waveforms using PCA. FIG. 3 illustrates an example of a two-dimensional space where the number of data points is 2, for simplicity's sake. For a point in a space represented by a first element axis (X axis) and a second element axis (Y axis) of data, an axis with maximum variance is set to a first principal component, and an axis orthogonal to the first principal component is set to a second principal component. In the case of multidimensional data having three or more elements, a second principal component axis with maximum variance is defined. In the case where the number of data elements is N points, a maximum of N principal components can be calculated. Here, a kth principal component (k<N) is an axis with maximum variance from among axes orthogonal to the first to (k−1)th principal components.

In multivariate statistical process control, the Q statistic is evaluated. The Q statistic is the sum of squares (sum of squared errors) of the distance between each sample and the principal component axis. In this embodiment, the mean square error obtained by dividing this value by the number of samples to be normalized is preferably used as the Q statistic. Here, if the number R of principal components is 1, the Q statistic is evaluated only by the distance from the first principal component. An abnormal sample is at a large distance from the principal component axis. Accordingly, if there is an abnormal sample, the Q statistic increases. Such Q statistic can be determined as abnormal, and the possibility of an equipment abnormality can be recognized. For example, a threshold of the Q statistic may be set. Then, in the case where the Q statistic is greater than or equal to the threshold, it can be determined that there is a possibility of an equipment abnormality. In the example in FIG. 2, the waveform P[2] is in an abnormal state including an abnormal sample, so that the Q statistic increases and is determined as abnormal.

The calculator 24 first extracts one waveform of one cycle of the cranks from the preprocessed time series data of the load stored in the storage 23, and performs PCA on the waveform to calculate the Q statistic. Whether the Q statistic is abnormal is then determined. For example, in the case where the Q statistic is greater than the threshold, the Q statistic is determined as abnormal. In the case where the Q statistic is not abnormal, a signal indicating that there is no abnormality is transmitted to the output portion 25. In the case where the Q statistic is abnormal, there is a possibility of an equipment abnormality, but there is also a possibility of the below-described applied load loss. Therefore, in the case where the Q statistic is abnormal, to determine whether there is an equipment abnormality, a plurality of successive waveforms of a plurality of cycles including the foregoing one waveform are extracted from the storage 23, and PCA is performed collectively on the plurality of waveforms to calculate the Q statistic. In the case where the Q statistic is not abnormal, a signal indicating that there is no abnormality is transmitted to the output portion 25. In the case where the Q statistic is abnormal, a signal indicating that there is an abnormality is transmitted to the output portion 25.

An abnormality diagnosis method in the abnormality diagnosis system 20 will be described below.

Figure 4:
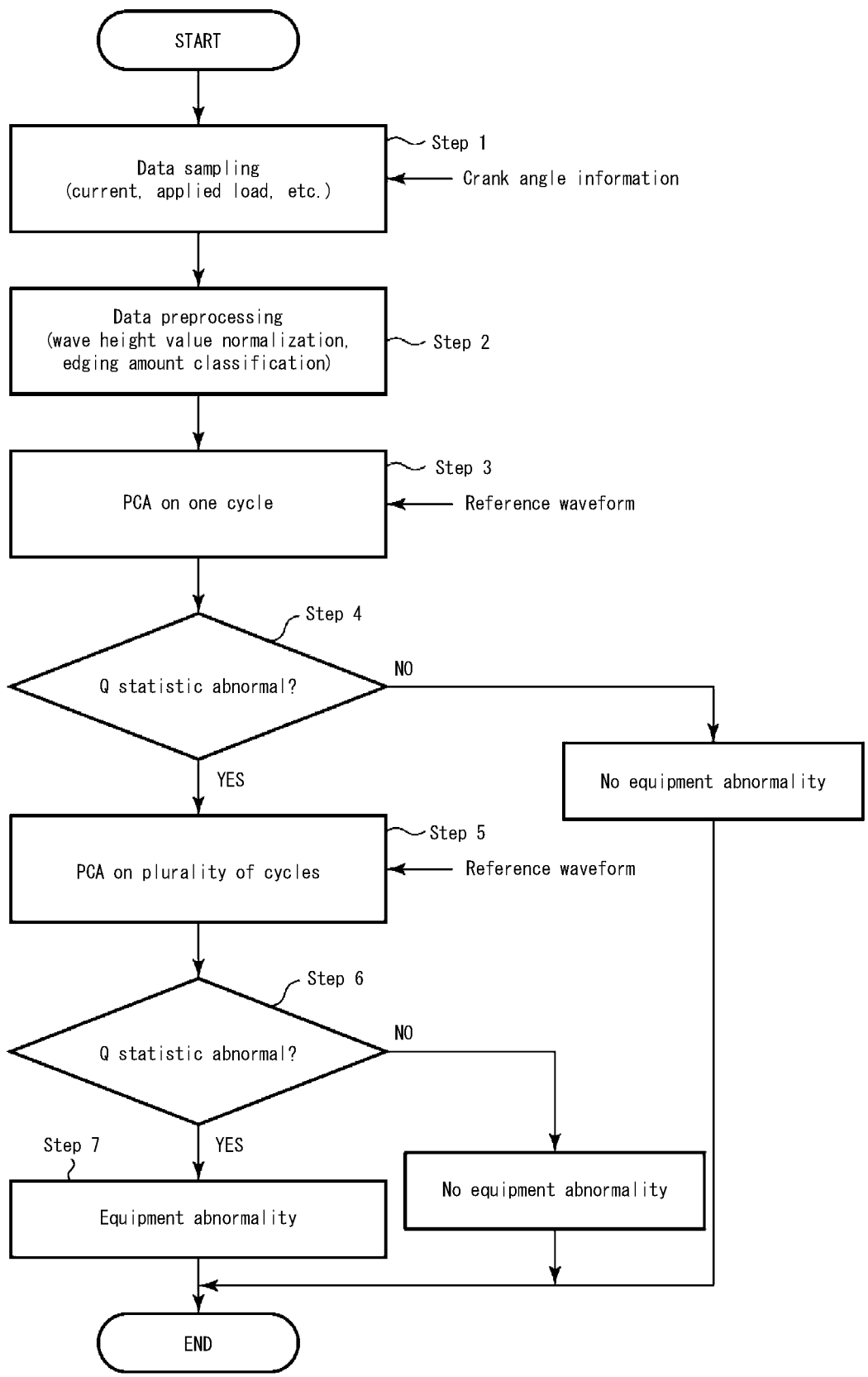
FIG. 4 is a flowchart illustrating an abnormality diagnosis method executed in the abnormality diagnosis system according to one of the disclosed embodiments.

FIG. 4 is a flowchart illustrating the abnormality diagnosis method executed in the abnormality diagnosis system 20.

The sizing press equipment 10 performs sizing press by, while intermittently conveying a slab 11, transmitting power from the drive motors 5 to the dies 2 via the cranks 6 and width-reducing the slab 11 by the dies 2 in a constant period. Such sizing press is successively performed on a plurality of slabs 11.

The abnormality diagnosis system 20 performs abnormality diagnosis on the sizing press equipment 10 from time series data indicating load such as the current value of each drive motor 5 or the applied load of each die 2 during the sizing press, by the following method.

First, the abnormality diagnosis system 20 samples the time series data of the load in the sizing press of the slab 11 of a certain material, by the sampler 21 (step 1).

The time series data indicating the load is a waveform in which one waveform with a peak corresponding to one cycle of the cranks 6 repeats itself, as mentioned above. Specifically, the time series data is a current waveform of the drive motors 5 or an applied load waveform of the dies 2.

Next, the abnormality diagnosis system 20 preprocesses the data sampled by the sampler 21, by the data preprocessor 22 (step 2).

The preprocessing of the data includes a process of normalizing the height of the waveform corresponding to one cycle of the cranks 6 and a process of classifying the data according to the edging amount (width reduction amount) in the width reduction. The process of classifying the data according to the edging amount (width reduction amount) in the width reduction is performed because the crank angle at which the applied load is generated differs and the waveform varies depending on the edging amount. Specifically, the timing of applied load generation is slower when the edging amount is smaller.

The preprocessed data is stored in the storage 23.

Next, the abnormality diagnosis system 20 extracts one waveform corresponding to one cycle of the cranks 6 from the preprocessed time series data of the slab of the material stored in the storage 23, and performs PCA on the one waveform (step 3).

In step 3, PCA is performed using a waveform of time series data in normal time (normal waveform) as a reference waveform, and the Q statistic is calculated from the analysis result by the foregoing multivariate statistical process control method.

Next, the abnormality diagnosis system 20 determines whether the Q statistic is abnormal (step 4). For example, in the case where the Q statistic is greater than or equal to the threshold, the abnormality diagnosis system 20 determines that the Q statistic is abnormal.

Figure 5:
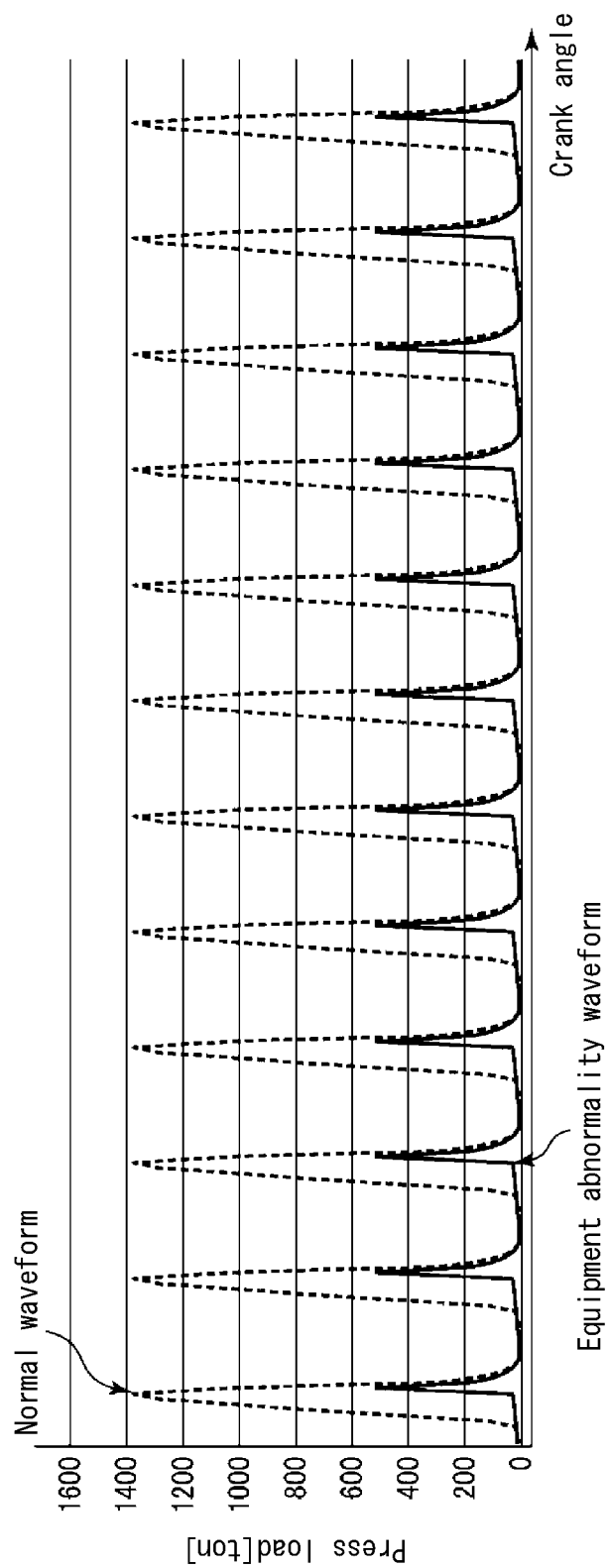
FIG. 5 is a diagram illustrating comparison between the case where an applied load waveform which is time series data indicating load is a normal waveform and the case where the applied load waveform is an equipment abnormality waveform.

In the case where an equipment abnormality occurs, since it is an irreversible phenomenon, the applied load waveform which is the time series data indicating the load becomes an equipment abnormality waveform that differs from the normal waveform in all cycles, as illustrated in FIG. 5. Accordingly, if there is no abnormality in one waveform corresponding to one cycle, it can be determined that there is no equipment abnormality. In FIG. 5, the horizontal axis represents the crank angle corresponding to time, and the vertical axis represents the applied load of each die. The same applies to FIG. 6 described later.

Figure 6:
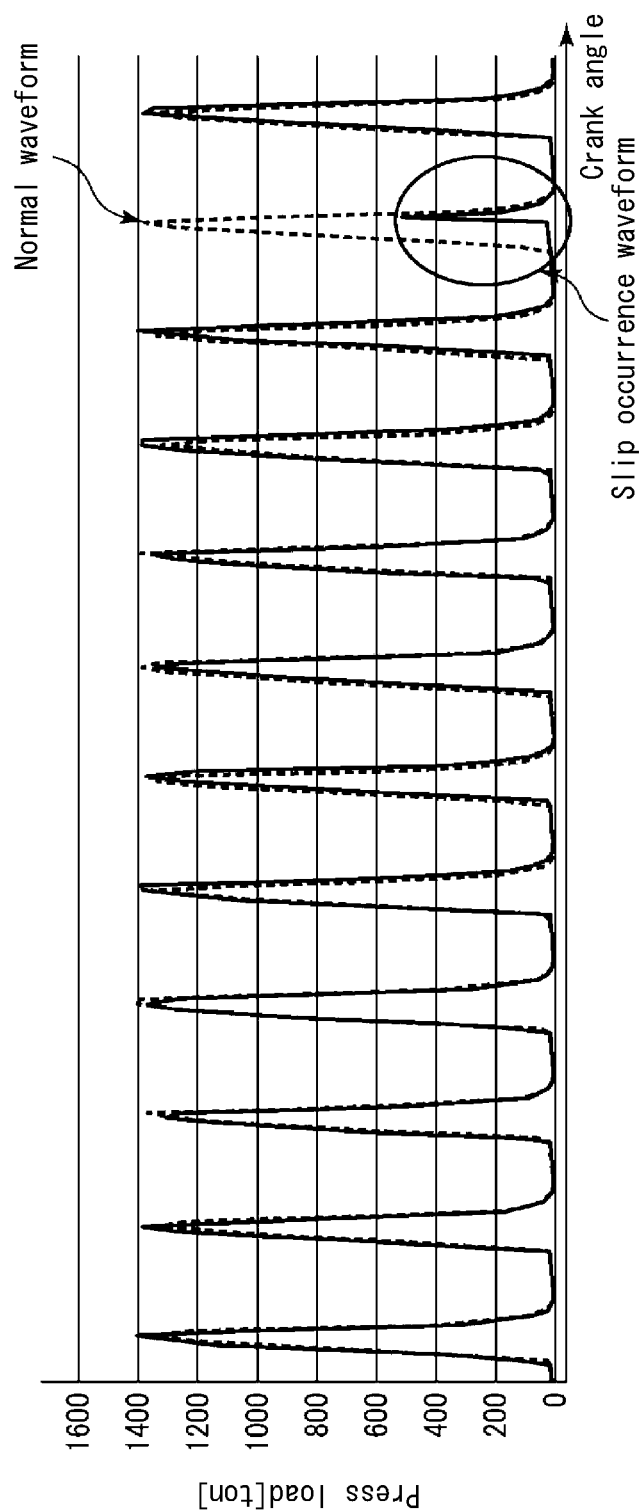
FIG. 6 is a diagram illustrating comparison between the case where the applied load waveform which is time series data indicating load is entirely a normal waveform and the case where the applied load waveform includes a slip occurrence waveform.

Even in the case where the Q statistic is determined as abnormal as a result of performing PCA on the one waveform, it cannot be determined that the abnormality is an equipment abnormality. In detail, in actual sizing press operation, a phenomenon (applied load loss) in which the applied load (load) hardly rises occurs sporadically due to, for example, insufficient material (slab) conveyance caused by a pinch roll slip. A waveform of a cycle in which a slip occurred is a slip occurrence waveform similar to the equipment abnormality waveform, as illustrated in FIG. 6. The resultant applied load waveform which is the time series data indicating the load is in a state in which the slip occurrence waveform appears sporadically in the normal waveform. Therefore, if the abnormality diagnosis system 20 happens to extract the slip occurrence waveform and performs PCA on the slip occurrence waveform, the Q statistic increases as in the case where there is an equipment abnormality. Such a phenomenon in which the applied load hardly rises occurs in about one to two cycles out of ten cycles, but cannot be predicted.

Hence, in the case where the Q statistic is determined as abnormal in step 4 as a result of performing PCA on the one waveform, the abnormality diagnosis system 20 extracts a plurality of successive waveforms of a plurality of cycles including the one waveform used in step 3 from the preprocessed time series data of the slab of the material stored in the storage 23, and performs PCA on the plurality of waveforms (step 5).

In step 5, PCA is performed collectively (simultaneously) on the plurality of waveforms of the plurality of cycles (i.e. the plurality of patterns successive in time), using the waveform of the time series data in normal time (normal waveform) as a reference waveform. From the analysis result, the Q statistic is calculated by the foregoing multivariate statistical process control method.

In the case where the Q statistic is not abnormal in step 4, a signal indicating that there is no equipment abnormality is transmitted to the output portion 25.

Next, the abnormality diagnosis system 20 determines whether the Q statistic calculated in step 5 is abnormal (step 6).

In the case where the abnormality determined in step 4 is an equipment abnormality, the applied load waveform differs from the normal waveform in all cycles, as illustrated in FIG. 5. In such a case, the Q statistic (mean square error) obtained by performing PCA on the plurality of waveforms in step 5 has substantially the same value as when PCA is performed on the one waveform.

In the case where the abnormality determined in step 4 as a result of performing PCA on the one waveform is an applied load loss caused by a pinch roll slip which occurs sporadically, for example, about one to two cycles out of ten cycles, the plurality of waveforms of the plurality of cycles other than the slip occurrence waveform are each approximately the normal waveform as illustrated in FIG. 6, so that the Q statistic is smaller than in the case where there is an equipment abnormality.

That is, by performing PCA collectively on the plurality of waveforms of the plurality of cycles and calculating the Q statistic, it is possible to determine whether the abnormality of the Q statistic when performing PCA on the one waveform in step 4 is an equipment abnormality or a sporadic applied load loss.

Thus, whether there is an equipment abnormality can be determined using the Q statistic in step 6. In the case where the Q statistic is abnormal, for example, in the case where the Q statistic is greater than or equal to the threshold, the abnormality diagnosis system 20 diagnoses the equipment as having an abnormality. In the case where the Q statistic is not abnormal, for example, in the case where the Q statistic is less than the threshold, the abnormality diagnosis system 20 diagnoses the equipment as having no abnormality.

Let the number of sampling points of the time series data of the one pattern used in the first principal component analysis be N1, the number of dimensions after dimensionality reduction by the first principal component analysis be k1, the number of sampling points of the time series data of the plurality of patterns used in the second principal component analysis be N2, the number of dimensions after dimensionality reduction by the second principal component analysis be k2, and the number of the plurality of patterns be M (M≥2), i.e. the number of the plurality of waveforms is M including the waveform corresponding to the one cycle used in the first principal component analysis. In the second principal component analysis, the feature of the time series signal of the M waveforms is more important than the disturbance of the waveform of the one cycle. Hence, the data may be acquired so as to satisfy the relationship N2<N1×M or k2<k1×M.

As a result of such data acquisition, the abnormality diagnosis on the one pattern can be performed using the detailed data of the one pattern, whereas the abnormality diagnosis on the plurality of patterns can be performed with the shape of the data as the M waveforms being preserved while preserving the feature of the one waveform to a certain extent. Thus, the evaluation of the waveform of the one pattern and the evaluation of the waveforms of the M patterns can both be achieved with reduced computational load. Moreover, while a minute disturbance of the waveform of the one pattern can be detected in the first abnormality determination of whether there is an abnormality, detection can be performed with focus on the repeatability of the waveform disturbance, the deviation (time delay) of the occurrence of the waveform, and the like in the second abnormality determination of whether there is an abnormality. This enables abnormality detection of high accuracy and high reliability.

Figure 7:
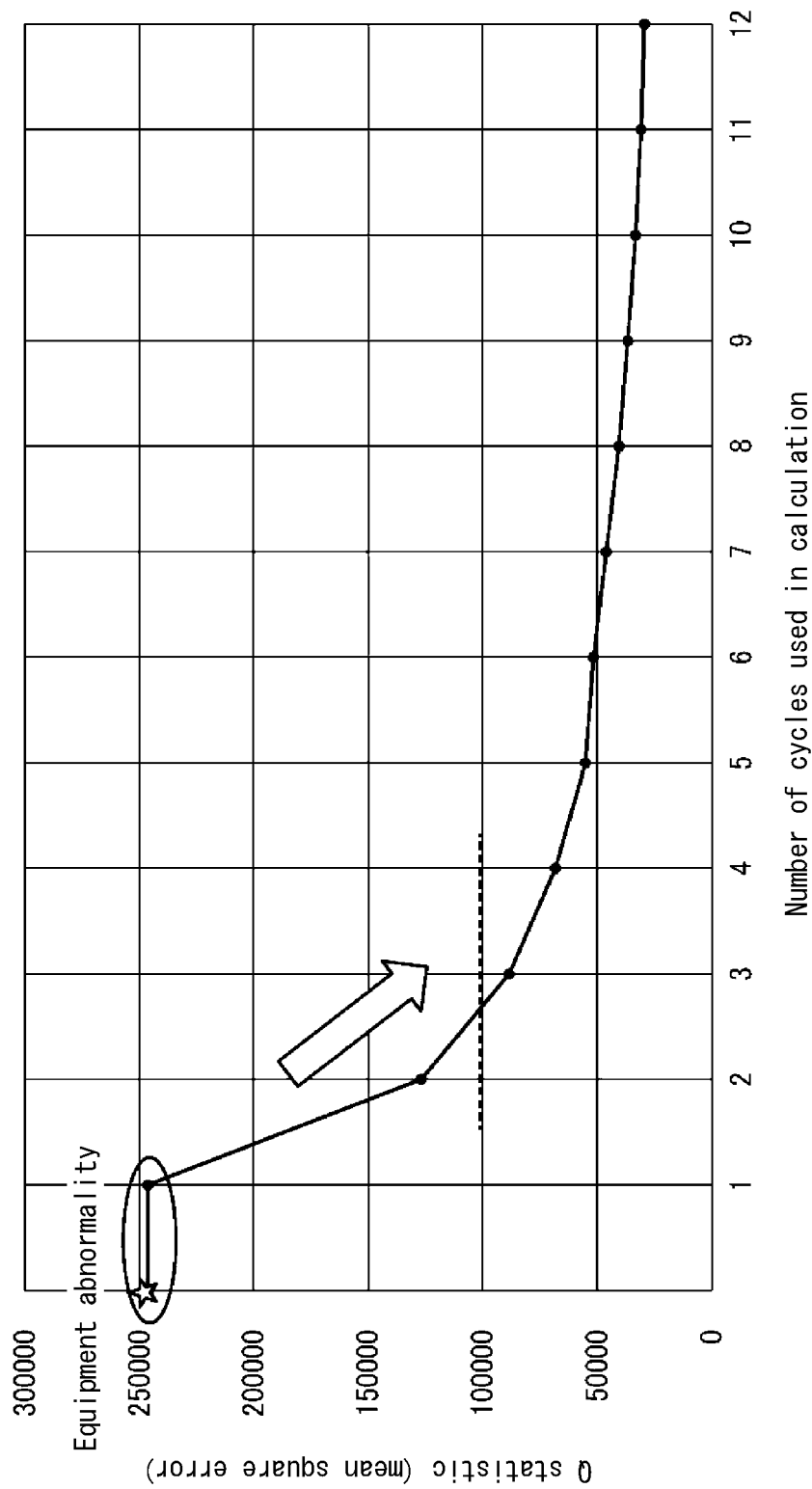
FIG. 7 is a diagram illustrating the relationship between the number of cycles and the Q statistic (mean square error) in the case where the slip occurrence waveform is included for one cycle (one waveform, i.e. a waveform of one cycle of a periodic wave).

FIG. 7 is a diagram illustrating the relationship between the number of cycles and the Q statistic (mean square error) in the case where the slip occurrence waveform is included for one cycle (one waveform). As illustrated in FIG. 7, when the number of cycles (i.e. the number of waveforms) used in PCA calculation is larger, the Q statistic (mean square error) is smaller, and the distinction between an equipment abnormality and an applied load loss is easier. For example, it is possible to determine that there is an equipment abnormality in the case where the Q statistic (mean square error) is greater than or equal to 10000, and determine that there is an applied load loss caused by a slip in the case where the Q statistic (mean square error) is less than 10000. It can also be understood from FIG. 7 that the distinction between an equipment abnormality and an applied load loss caused by a slip is further eased when the number of cycles (the number of waveforms) is three or more.

As described above, according to this embodiment, the abnormality diagnosis system 20 that performs abnormality diagnosis on the sizing press equipment 10 can prevent wrongly diagnosing the equipment as having an abnormality when the equipment actually does not have an abnormality.

It is therefore possible to prevent, for example, stopping the equipment due to wrong diagnosis, and suppress a decrease in production efficiency.

Moreover, since the preprocessor 22 performs not only a process of normalizing the height of the waveform corresponding to one cycle of the cranks 6 but also a process of classifying the data according to the edging amount (width reduction amount) in the width reduction as preprocessing, waveform variations depending on the edging amount (width reduction amount) can be suppressed.

Although one of the disclosed embodiments has been described above, the presently disclosed techniques are not limited to the foregoing embodiment, and various modifications are possible within the scope of the idea of the present disclosure. For example, although the presently disclosed techniques are applied to abnormality detection of sizing press equipment in the foregoing embodiment, the presently disclosed techniques can be applied to any equipment in which the operation of an equipment drive member repeats a fixed pattern. Although a waveform is used as an example of a repeated pattern of time series data indicating load in the foregoing embodiment, the presently disclosed techniques are not limited to such. Although current or applied load is used as an example of time series data indicating load in the foregoing embodiment, the presently disclosed techniques are not limited to such.

REFERENCE SIGNS LIST 2 die
3 entry pinch roll
4 exit pinch roll
5 drive motor
6 crank
10 sizing press equipment
11 slab
20 abnormality diagnosis system
21 sampler
22 data preprocessor
23 storage
24 calculator
25 output portion

The invention claimed is:

1. An abnormality diagnosis system configured to perform abnormality diagnosis on equipment that performs operation repeating a fixed pattern, the abnormality diagnosis system comprising:
   a sampler configured to sample time series data indicating a state of the equipment, the time series data repeating a pattern corresponding to the fixed pattern; and
   a calculator configured to perform principal component analysis based on the time series data sampled by the sampler, and diagnose whether the equipment has an abnormality,
   wherein the calculator is configured to:
   perform first principal component analysis on one pattern in the time series data indicating the state, and perform first abnormality determination of whether there is an abnormality based on a result of the first principal component analysis;
   in the case where a result of the first abnormality determination is that there is an abnormality, perform second principal component analysis collectively on a plurality of patterns successive in time including the pattern subjected to the first principal component analysis in the time series data indicating the state, and perform second abnormality determination of whether there is an abnormality based on a result of the second principal component analysis; and
   in the case where a result of the second abnormality determination is that there is an abnormality, diagnose the equipment as having an abnormality.

2. The abnormality diagnosis system according to claim 1, wherein the first abnormality determination is based on Q statistic calculated from the result of the first principal component analysis, and the second abnormality determination is based on Q statistic calculated from the result of the second principal component analysis.

3. The abnormality diagnosis system according to claim 1, wherein $N2 < N1 \times M$ or $k2 < k1 \times M$, where N1 is the number of sampling points of time series data used in the first principal component analysis by the calculator, k1 is the number of dimensions after dimensionality reduction by the first principal component analysis, N2 is the number of sampling points of time series data used in the second principal component analysis, k2 is the number of dimensions after dimensionality reduction by the second principal component analysis, and M is the number of the plurality of patterns where $M \geq 2$.

4. The abnormality diagnosis system according to claim 1, wherein the equipment is sizing press equipment that width-reduces a slab by driving a die using a drive motor, and
   the time series data indicating the state of the equipment is a current waveform of the drive motor or an applied load waveform of the die.

5. The abnormality diagnosis system according to claim 4, further comprising
   a data preprocessor configured to subject the time series data sampled by the sampler to preprocessing including a process of normalizing a waveform height and a process of classification according to a width reduction amount.

6. An abnormality diagnosis method of performing abnormality diagnosis on equipment that performs operation repeating a fixed pattern, the abnormality diagnosis method comprising:
   sampling time series data indicating a state of the equipment, the time series data repeating a pattern corresponding to the fixed pattern;
   performing first principal component analysis on one pattern in the time series data indicating the state;
   performing first abnormality determination of whether there is an abnormality based on a result of the first principal component analysis;
   performing, in response to a result of the first abnormality determination being that there is an abnormality, second principal component analysis collectively on a plurality of patterns successive in time including the pattern subjected to the first principal component analysis in the time series data indicating the state;
   performing second abnormality determination of whether there is an abnormality based on a result of the second principal component analysis; and
   diagnosing the equipment as having an abnormality, in response to a result of the second abnormality determination being that there is an abnormality.

7. The abnormality diagnosis method according to claim 6, wherein the first abnormality determination is based on Q statistic calculated from the result of the first principal component analysis, and the second abnormality determination is based on Q statistic calculated from the result of the second principal component analysis.

8. The abnormality diagnosis method according to claim 6, wherein $N2<N1\times M$ or $k2<k1\times M$, where N1 is the number of sampling points of time series data used in the first principal component analysis, k1 is the number of dimensions after dimensionality reduction by the first principal component analysis, N2 is the number of sampling points of time series data used in the second principal component analysis, k2 is the number of dimensions after dimensionality reduction by the second principal component analysis, and M is the number of the plurality of patterns where $M\geq 2$.

9. The abnormality diagnosis method according to claim 6, wherein the equipment is sizing press equipment that width-reduces a slab by driving a die using a drive motor, and
the time series data indicating the state of the equipment is a current waveform of the drive motor or an applied load waveform of the die.

10. The abnormality diagnosis method according to claim 9, further comprising
subjecting the sampled time series data to preprocessing including a process of normalizing a waveform height and a process of classification according to a width reduction amount.

11. The abnormality diagnosis system according to claim 2, wherein $N2<N1\times M$ or $k2<k1\times M$, where N1 is the number of sampling points of time series data used in the first principal component analysis by the calculator, k1 is the number of dimensions after dimensionality reduction by the first principal component analysis, N2 is the number of sampling points of time series data used in the second principal component analysis, k2 is the number of dimensions after dimensionality reduction by the second principal component analysis, and M is the number of the plurality of patterns where $M\geq 2$.

12. The abnormality diagnosis system according to claim 2, wherein the equipment is sizing press equipment that width-reduces a slab by driving a die using a drive motor, and
the time series data indicating the state of the equipment is a current waveform of the drive motor or an applied load waveform of the die.

13. The abnormality diagnosis system according to claim 3, wherein the equipment is sizing press equipment that width-reduces a slab by driving a die using a drive motor, and
the time series data indicating the state of the equipment is a current waveform of the drive motor or an applied load waveform of the die.

14. The abnormality diagnosis system according to claim 11, wherein the equipment is sizing press equipment that width-reduces a slab by driving a die using a drive motor, and
the time series data indicating the state of the equipment is a current waveform of the drive motor or an applied load waveform of the die.

15. The abnormality diagnosis method according to claim 7, wherein $N2<N1\times M$ or $k2<k1\times M$, where N1 is the number of sampling points of time series data used in the first principal component analysis, k1 is the number of dimensions after dimensionality reduction by the first principal component analysis, N2 is the number of sampling points of time series data used in the second principal component analysis, k2 is the number of dimensions after dimensionality reduction by the second principal component analysis, and M is the number of the plurality of patterns where $M\geq 2$.

16. The abnormality diagnosis method according to claim 7, wherein the equipment is sizing press equipment that width-reduces a slab by driving a die using a drive motor, and
the time series data indicating the state of the equipment is a current waveform of the drive motor or an applied load waveform of the die.

17. The abnormality diagnosis method according to claim 8, wherein the equipment is sizing press equipment that width-reduces a slab by driving a die using a drive motor, and
the time series data indicating the state of the equipment is a current waveform of the drive motor or an applied load waveform of the die.

18. The abnormality diagnosis method according to claim 15, wherein the equipment is sizing press equipment that width-reduces a slab by driving a die using a drive motor, and
the time series data indicating the state of the equipment is a current waveform of the drive motor or an applied load waveform of the die.

* * * * *